No. 754,643. Patented March 15, 1904.

UNITED STATES PATENT OFFICE.

KARL DANZIGER, OF ZAWODZE, NEAR KATTOWITZ, GERMANY.

PROCESS OF SEPARATING IRON PYRITES FROM ZINC-BLENDE.

SPECIFICATION forming part of Letters Patent No. 754,643, dated March 15, 1904.

Application filed May 29, 1903. Serial No. 159,324. (No specimens.)

*To all whom it may concern:*

Be it known that I, KARL DANZIGER, of Zawodze, near Kattowitz, Upper Silesia, in the German Empire, have invented a new and useful Process of Separating Iron Pyrites from Zinc-Blende, of which the following is a specification.

I have found that if the zinc-blende, preferably in a ground state, is spread on a floor heated by fire-gases or the like the iron pyrites which is contained in the zinc-blende is transferred by oxidation under the influence of heat and moisture into ferric salts, (sulfate of iron,) which are soluble in water, while the zinc sulfid is not affected by the oxidizing action.

The process may be illustrated by the following formula:

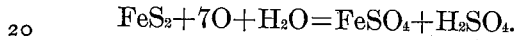

$$FeS_2 + 7O + H_2O = FeSO_4 + H_2SO_4.$$

The sulfuric acid formed by the oxidizing process acts on the other elements of the ore and forms sulfates of alumina, of magnesia, of lime, and other sulfates. This action of the sulfuric acid is very useful for the process, as it decomposes the ore. After the oxidation of the sulfid of iron or pyrite is finished the ferrous salt is extracted by water and the remaining zinc ore is dried, which may be done on the same floor.

In carrying out my invention I preferably use a floor under which are arranged channels. Through these channels I lead the (waste) fire-gases from the steam-boilers or from kilns to the chimney. In this manner the caloric content of these gases, which is generally lost, is used profitably. On the floor the zinc-blende is spread and may be exposed also to the action of air and moisture, which under the action of the heat decompose and oxidize the pyrite component of the ore.

Having now described my invention, what I claim, and desire to secure by Letters Patent, is—

A process for separating iron pyrite from zinc-blende, which consists in exposing the zinc-blende to the action of air moisture and heat and extracting the ferrous salt, which has been formed by the oxidizing action by water.

In witness whereof I have hereunto set my hand in presence of two witnesses.

KARL DANZIGER.

Witnesses:
 HENRY HARPER,
 WOLDEMAR HAUPT.